(12) United States Patent
Acosta Rodriguez et al.

(10) Patent No.: US 10,190,272 B2
(45) Date of Patent: Jan. 29, 2019

(54) VEHICLE DISTANCE ADVISE SYSTEMS

(71) Applicant: FORD GLOBAL TECHNOLOGIES, LLC, Dearborn, MI (US)

(72) Inventors: Armando Acosta Rodriguez, Mexico City (MX); Nathali Vasquez Henao, Mexico City (MX); Ernesto Zepeda Lopez, Mexico City (MX); Jorge Arturo Ortiz Flores, Mexico City (MX); Mario Alejandro Medina Huerta, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/623,720

(22) Filed: Jun. 15, 2017

(65) Prior Publication Data

US 2018/0363256 A1  Dec. 20, 2018

(51) Int. Cl.
 *E01F 13/02* (2006.01)
 *B60Q 7/00* (2006.01)
 *E01F 9/70* (2016.01)
 *E01F 9/654* (2016.01)
 *E01F 9/619* (2016.01)
 *E01F 9/692* (2016.01)

(52) U.S. Cl.
 CPC ............... *E01F 9/70* (2016.02); *B60Q 7/005* (2013.01); *E01F 9/619* (2016.02); *E01F 9/654* (2016.02); *E01F 9/692* (2016.02); *E01F 13/02* (2013.01)

(58) Field of Classification Search
 CPC . B60Q 7/00; B60Q 7/005; E01F 9/662; E01F 13/028; E01F 9/619; E01F 9/654; E01F 9/692; E01F 9/70
 See application file for complete search history.

(56) References Cited

U.S. PATENT DOCUMENTS

| | | | | |
|---|---|---|---|---|
| 2,843,954 A * | 7/1958 | Rheeling | ................ | B60Q 7/005 280/851 |
| 2,894,257 A * | 7/1959 | Crooks | ................... | B60Q 7/00 362/486 |
| 2,997,573 A * | 8/1961 | Nyborg | ................... | B60Q 7/00 340/473 |
| 3,128,951 A * | 4/1964 | Nicholl | ................... | B60Q 7/00 200/60 |
| 4,952,910 A | 8/1990 | Straten et al. | | |
| 7,164,352 B2 * | 1/2007 | Nelson | .................... | B60Q 1/52 340/472 |
| 7,395,776 B2 * | 7/2008 | Harruna | ............... | G09F 21/048 116/28 R |
| 7,690,858 B1 | 4/2010 | Chiavola | | |

(Continued)

FOREIGN PATENT DOCUMENTS

| | | | | |
|---|---|---|---|---|
| CN | 100999200 A | 7/2007 | | |
| CN | 201052758 Y * | 4/2008 | ............... | B60Q 7/00 |

(Continued)

*Primary Examiner* — R. A. Smith (74) *Attorney, Agent, or Firm* — Carlson, Gaskey & Olds (57) ABSTRACT

A vehicle distance advise system includes a first housing section including a first reflective strip and a first warning device connected to the first reflective strip, and a second housing section removably connected to the first housing section. The distance advise system may be connected to a vehicle and then set-up to alert other vehicle drivers of the presence of an immobilized vehicle.

18 Claims, 6 Drawing Sheets

(56) References Cited

U.S. PATENT DOCUMENTS

| | | | | |
|---|---|---|---|---|
| 8,567,085 B2 * | 10/2013 | Roeske | ............... | G01B 3/1041 |
| | | | | 33/769 |
| 9,558,686 B2 * | 1/2017 | Chaney | ................... | G09F 17/00 |
| 2005/0168818 A1 * | 8/2005 | Hudson, Jr. | .......... | B65H 75/446 |
| | | | | 359/515 |
| 2014/0209011 A1 * | 7/2014 | Byun | .................... | B60Q 7/005 |
| | | | | 116/63 P |

FOREIGN PATENT DOCUMENTS

| | | | | | |
|---|---|---|---|---|---|
| CN | 203007863 U | | 6/2013 | | |
| CN | 204097900 U | | 1/2015 | | |
| CN | 204551309 U | | 8/2015 | | |
| DE | 714771 C | * | 12/1941 | ............... | B60Q 7/00 |
| DE | 2542685 A1 | * | 4/1977 | ............... | B60Q 7/00 |
| FR | 858494 A | * | 11/1940 | ............... | B60Q 7/00 |
| GB | 1400567 A | * | 7/1975 | ............... | B60Q 7/00 |
| GB | 2192017 A | | 12/1987 | | |
| GB | 2291670 A | * | 1/1996 | ............... | B60Q 7/00 |
| KR | 20080006954 A | * | 1/2008 | ............... | B60Q 7/00 |
| KR | 101259282 B1 | * | 5/2013 | ............... | B60Q 7/00 |
| KR | 101452641 B1 | | 10/2014 | | |

\* cited by examiner

VEHICLE DISTANCE ADVISE SYSTEMS

TECHNICAL FIELD

This disclosure relates to vehicle distance advise systems that include one or more warning devices positionable at desired distances from the vehicle to alert other vehicle drivers of the presence of an immobilized vehicle.

BACKGROUND

Traffic regulations require commercial motor vehicles that are stopped upon a travel portion or shoulder portion of a roadway for any reason other than necessary traffic stops to set-up warning devices (e.g., warning triangles). The warning devices indicate to other drivers of the roadway that the vehicle is stopped and potentially disabled because of a vehicle failure, a vehicle accident, etc. It can be tedious and time consuming to position the warning devices at regulation distances from the disabled vehicle.

SUMMARY

A vehicle distance advise system according to an exemplary aspect of the present disclosure includes, among other things, a first housing section including a first reflective strip and a first warning device connected to the first reflective strip, and a second housing section removably connected to the first housing section.

In a further non-limiting embodiment of the foregoing system, a third housing section is removably connected to the second housing section.

In a further non-limiting embodiment of either of the foregoing systems, the second housing section is magnetically connected to the first housing section.

In a further non-limiting embodiment of any of the foregoing systems, the first housing section includes a reel rotatably mounted within a housing of the first housing section.

In a further non-limiting embodiment of any of the foregoing systems, the first reflective strip is received on the reel.

In a further non-limiting embodiment of any of the foregoing systems, the first warning device is connected to the first reflective strip by a connector.

In a further non-limiting embodiment of any of the foregoing systems, the connector is a hook that connects to a bracket of the first warning device.

In a further non-limiting embodiment of any of the foregoing systems, the second housing section includes a second reflective strip and a second warning device connected to the second reflective strip.

In a further non-limiting embodiment of any of the foregoing systems, the second reflective strip includes a different length than the first reflective strip.

In a further non-limiting embodiment of any of the foregoing systems, the first warning device includes a reflective surface.

In a further non-limiting embodiment of any of the foregoing systems, the first warning device is a warning triangle.

In a further non-limiting embodiment of any of the foregoing systems, the first warning device is movable between a non-deployed position in which it is received against a housing of the first housing section and a deployed position in which it is spaced a distance apart from the housing.

In a further non-limiting embodiment of any of the foregoing systems, the first housing section includes a first magnet and the second housing section includes a second magnet.

In a further non-limiting embodiment of any of the foregoing systems, the first magnet is positioned on an exterior surface of a first housing of the first housing section and the second magnet is positioned on an exterior surface of a second housing of the second housing section.

In a further non-limiting embodiment of any of the foregoing systems, the first housing section includes a reel having a shaft disposed between opposing end disks.

A method according to another exemplary aspect of the present disclosure includes, among other things, connecting a distance advise system to a vehicle, and positioning a first warning device of the distance advise system at a first desired distance from the vehicle.

In a further non-limiting embodiment of the foregoing methods, connecting the distance advise system includes magnetically connecting a first housing section of the distance advise system to the vehicle and magnetically connecting a second housing section of the distance advise system to the vehicle.

In a further non-limiting embodiment of either of the foregoing methods, the first housing section and the second housing section are both connected to a rear portion of the vehicle.

In a further non-limiting embodiment of any of the foregoing methods, the first housing section is connected to a rear portion of the vehicle and the second housing section is connected to a front portion of the vehicle.

In a further non-limiting embodiment of any of the foregoing methods, the method includes positioning a second warning device of the distance advise system at a second desired distance from the vehicle. The second desired distance is a different distance than the first desired distance.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle distance advise systems for warning other vehicle drivers of a vehicle immobilizing event. An exemplary vehicle distance advise system includes two or more housing sections that are magnetically connected to one another. Each housing section may be magnetically connected to the vehicle and may house a reel, a reflective strip received on the reel, and a warning device connected to the reflective strip. The reflective strips may be unwound from the reels to position the warning devices at desired distances from the vehicle. These and other features of this disclosure are described in greater detail in the following paragraphs of this detailed description.

Figure 1:
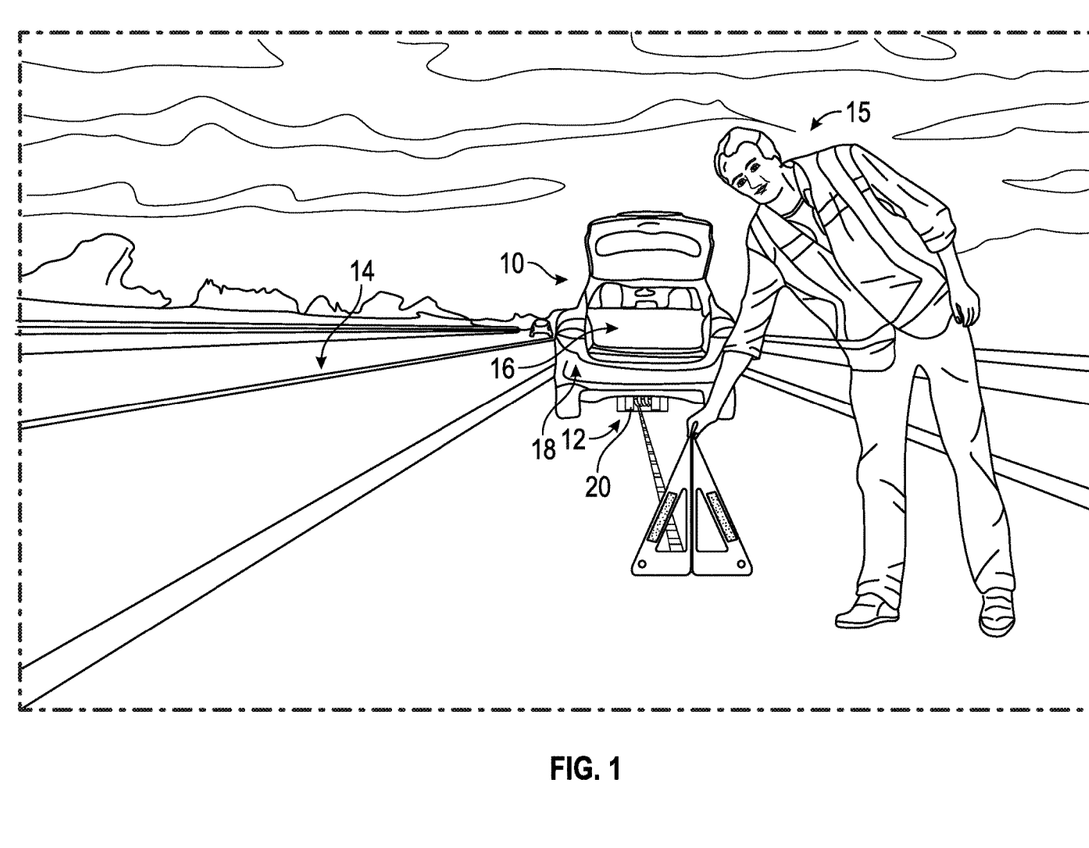
FIG. 1 illustrates a vehicle equipped with a distance advise system.

FIG. 1 illustrates a vehicle 10 equipped with a distance advise system 12. The vehicle 10 may be a car, a truck, a van, a sport utility vehicle, a semi-trailer truck, or any other type of vehicle. Although a specific component relationship is illustrated in the figures of this disclosure, the illustrations are not intended to limit this disclosure. In other words, the placement and orientation of the various components of the distance advise system 12 of the vehicle 10 are shown schematically and could vary within the scope of this disclosure. In addition, the various figures accompanying this disclosure are not necessarily to scale, and some features may be exaggerated or minimized to show certain details of a particular component.

The distance advise system 12 may be connected to the vehicle 10 and set-up to warn other vehicle drivers of a vehicle immobilizing event. In this disclosure, the term "vehicle immobilizing event" describes any vehicle event that makes it necessary for the vehicle 10 to be stopped in either the traveled portion or the shoulder portion of a roadway 14 for any cause other than necessary traffic stops. Exemplary vehicle immobilizing events include flat tires, engine or other mechanical failures, vehicle accidents, empty fuel tanks, etc.

The distance advise system 12 may be stored in a cargo area 16 of the vehicle 10 when not being used. The cargo area 16 could be located anywhere on or within the vehicle 10. The distance advise system 12 may be removed from the cargo area 16 and attached to a portion of the vehicle 10 by a passenger 15 of the vehicle 10 as needed to warn other drivers of the vehicle immobilizing event. In an embodiment, the distance advise system 12 is connected at a rear portion 18 of the vehicle 10. Other mounting locations are also contemplated within this disclosure, including but not limited to a front portion of the vehicle 10 or any other exterior location of the vehicle 10.

Figure 2:
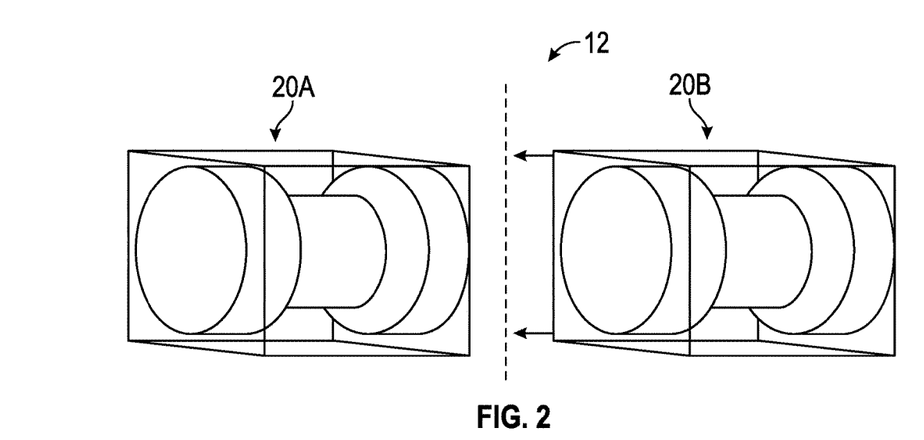
FIG. 2 illustrates a vehicle distance advise system according to a first embodiment of this disclosure.
Figure 3:
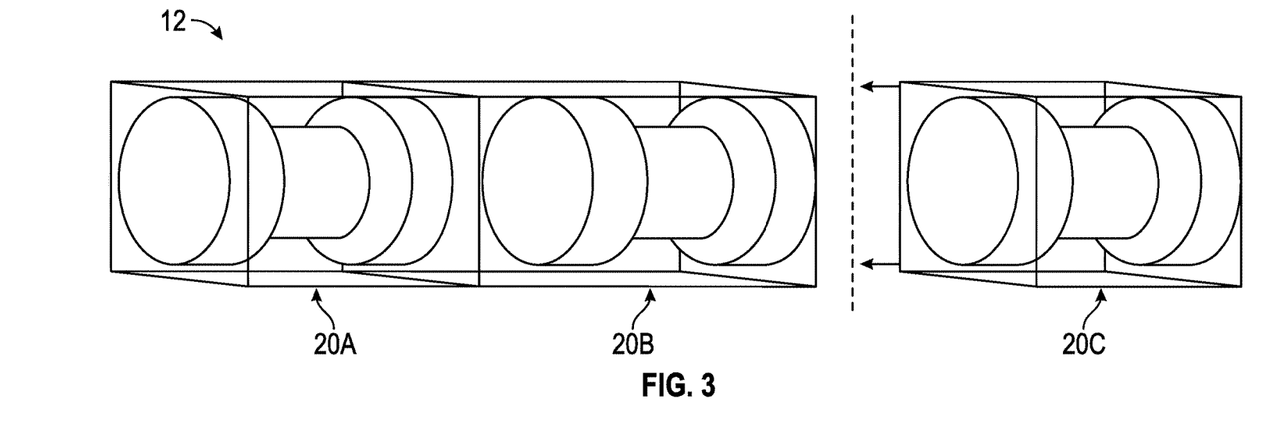
FIG. 3 illustrates a vehicle distance advise system according to a second embodiment of this disclosure.

The distance advise system 12 may be a modular unit made up of multiple connectable housing sections 20. In an embodiment, the distance advise system 12 includes a first housing section 20A and a second housing section 20B connectable to the first housing section 20A (see FIG. 2). In another embodiment, the distance advise system 12 includes a first housing section 20A, a second housing section 20B connectable to the first housing section 20A, and a third housing section 20C that is connectable to the second housing section 20B (see FIG. 3). The distance advise system 12 could include two or more housing sections 20.

As discussed in greater detail below, the various housing sections 20 of the distance advise system 12 may be magnetically connected to one another.

Figure 4:
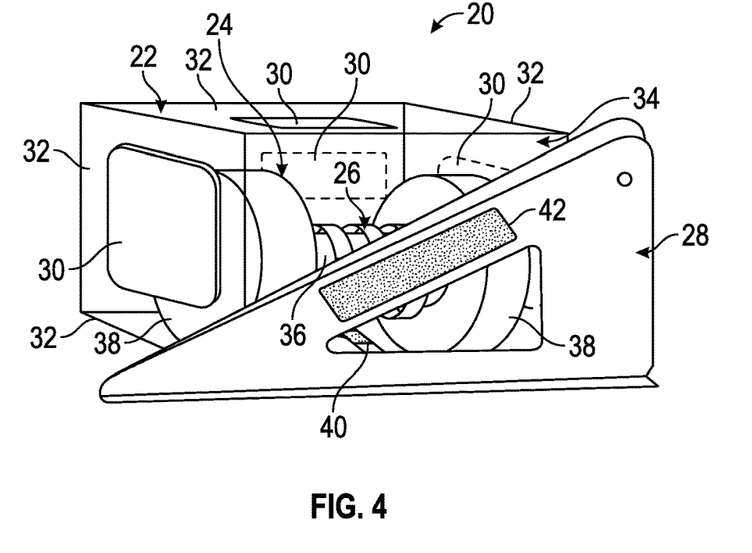
FIG. 4 illustrates a housing section of an exemplary vehicle distance advise system.
Figure 5:
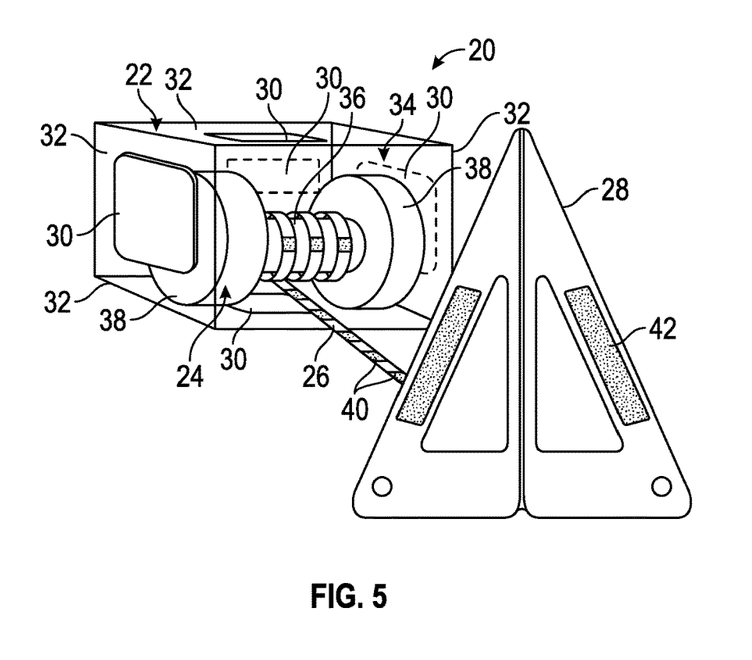
FIG. 5 illustrates a deployed position of a warning device of the housing section of FIG. 4.

FIGS. 4 and 5 illustrate various features of an exemplary housing section 20 of the distance advise system 12. The various housing sections that make up the distance advise system 12 could be configured similarly to the housing section 20 shown in FIGS. 4 and 5. The housing section 20 may include a housing 22, a reel 24, a reflective strip 26, and a warning device 28.

In an embodiment, the housing 22 of the housing section 20 is a plastic, rectangular enclosure for housing the reel 24. The type of plastic material utilized to construct the housing 22 is not intended to limit this disclosure. A plurality of magnets 30 may be secured to the housing 22 for magnetically connecting the housing section 20 to other housing sections of the distance advise system 12 (see, e.g., FIG. 6) or for magnetically connecting the distance advise system 12 to the vehicle 10. In an embodiment, at least one external face 32 of the housing 22 may include one or more of the magnets 30. A front opening 34 of the housing 22 excludes any magnets 30.

The reel 24 may be rotatably mounted within the housing 22 in any known manner. The reel 24 is rotatable within the housing 22 to wind or unwind the reflective strip 26 relative to the reel 24. The reel 24 includes a shaft 36 that extends between opposing end disks 38. The reel 24 may be configured such that the shaft 36, the end disks 38, or both are rotatable relative to the housing 22. In an embodiment, the end disks 38 include a diameter that is larger than the diameter of the shaft 36.

The reflective strip 26 may be wound onto the shaft 36 between the end disks 38 of the reel 24. An end of the reflective strip 26 may be affixed to the reel 24 to prevent the reflective strip 26 from becoming displaced from the reel 24. In an embodiment, the reflective strip 26 includes a reflective surface 40 that enhances the visibility of the reflective strip 26.

The reflective strip 26 is selectively unrolled from the reel 24 to position the warning device 28 at a desired distance from a broken down or otherwise disabled vehicle. The reflective strip 26 may include a specific length (e.g., 10 feet, 100 feet, between 100 and 500 feet, etc.) for positioning the warning device 28 a regulation distance from the vehicle. The regulation distance may be a specific distance required by federal traffic regulations (see, e.g., 49 C.F.R. 392.22(b)) or any other state or federal transportation regulation. The various housing sections 20 that make up the distance advise system 12 could each include a reflective strip 26 having a different length than the reflective strips 26 of the other housing sections 20 of the distance advise system 12.

The warning device 28 is shown in a non-deployed position in FIG. 4 and in a deployed position in FIG. 5. In the non-deployed position, the warning device 28 may be folded up and held in close proximity to the housing 22 of the housing section 20. In an embodiment, the warning device 28 is held against the housing 22 and at least partially covers the front opening 34 when in the non-deployed position. In the deployed position, the warning device 28 is unfolded and is then moved apart from the housing 22 by pulling the reflective strip 26. In this way, the warning device 28 can be moved to a desired distance apart from the vehicle.

In an embodiment, the warning device 28 is a warning triangle. However, other warning devices having other shapes and sizes are also contemplated within the scope of this disclosure. Similar to the reflective strip 26, the warning device 28 may include one or more reflective surfaces 42 for enhancing the visibility of the warning device 28.

Figure 6:
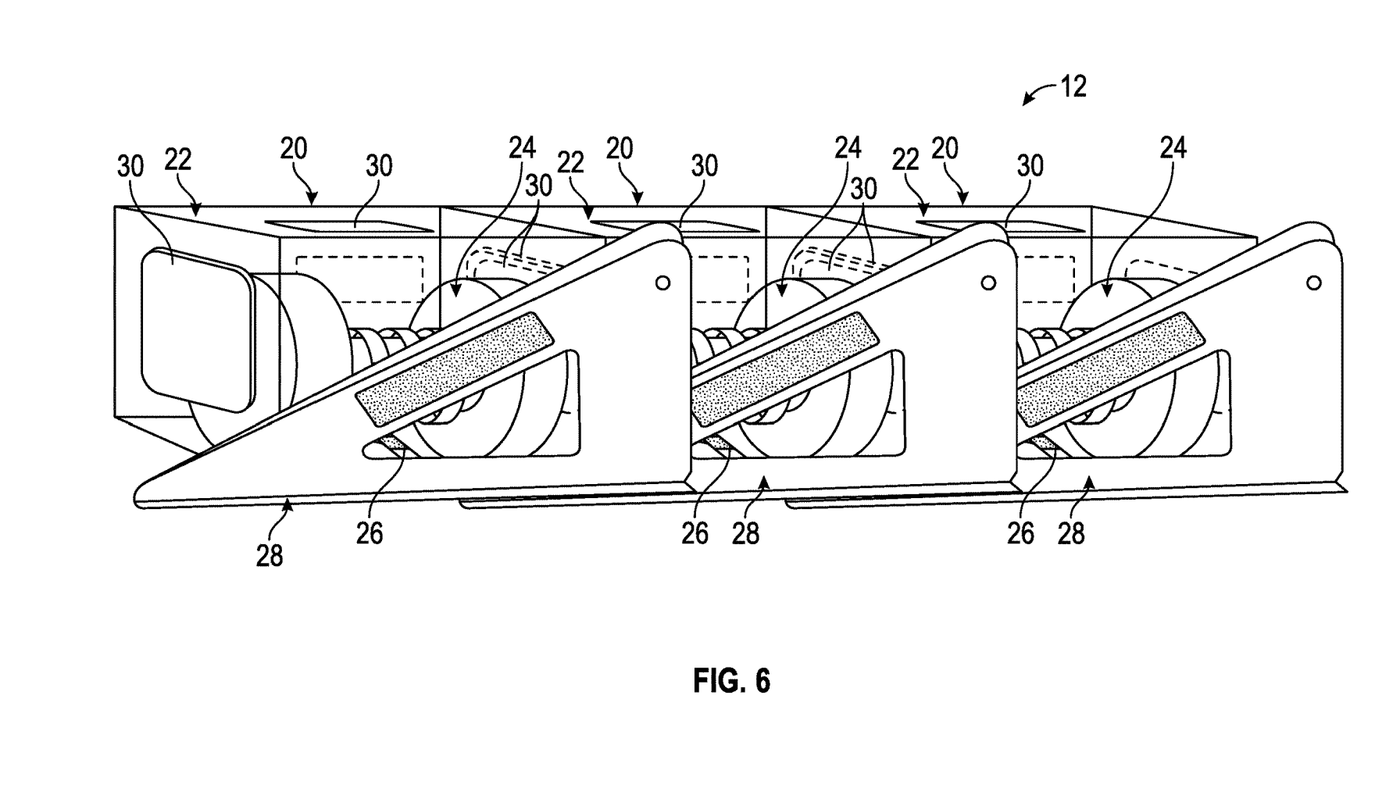
FIG. 6 illustrates a plurality of housing sections that are connected together to assemble a vehicle distance advise system.

A plurality of the housing sections 20 may be magnetically connected together to assemble the distance advise system 12 (see FIG. 6). The distance advise system 12 could include two or more of the housing sections 20, with each housing section 20 including a housing 22, a reel 24, a reflective strip 26, and a warning device 28.

Figures 7A, 7B:
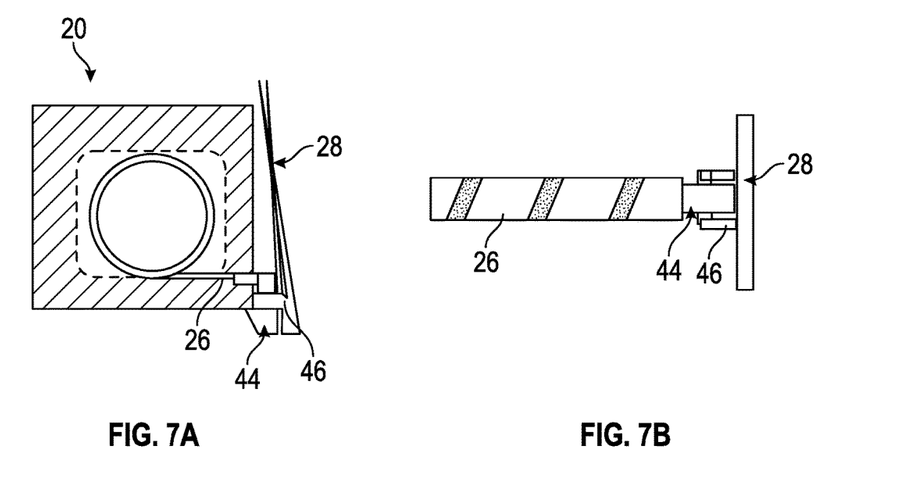
FIGS. 7A and 7B illustrate a connection between a warning device and a reflective strip of an exemplary vehicle distance advise system.

Referring now to FIGS. 7A and 7B, the warning device 28 is connected to the reflective strip 26 by a connector 44. By virtue of this connection, the warning device 28 can be moved to the deployed position of FIG. 5 by unwinding the reflective strip 26 from the reel 24. The connector 44 may be attached to a bracket 46 of the warning device 28. In an embodiment, the connector 44 is a hook that hooks onto the bracket 46. However, the warning device 28 could be connected to the reflective strip 26 using any type of connector or combination of connectors.

Figure 8:
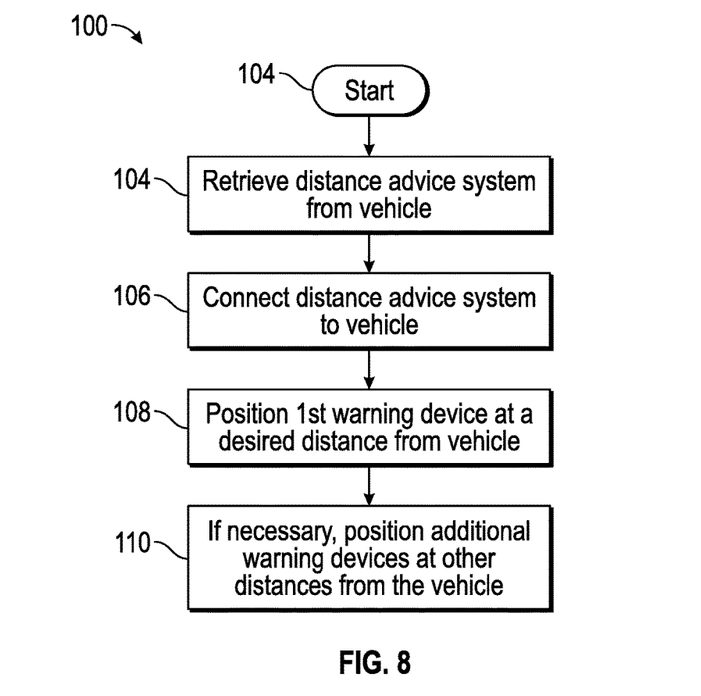
FIG. 8 schematically illustrates a method for using a vehicle distance advise system in response to a vehicle immobilizing event.

FIG. 8, with continued reference to FIGS. 1-7B, schematically illustrates a method 100 for utilizing the vehicle distance advise system 12 to alert other vehicle drivers of a vehicle immobilizing event. For example, the method 100 can be performed by a passenger 15 of the vehicle 10 if the vehicle 10 is forced to stop in either the traveled portion or the shoulder portion of the roadway 14 due to a vehicle immobilizing event.

The method 100 begins at block 102. At block 104, the distance advise system 12 is retrieved from its storage location within the vehicle 10. The distance advise system 12 may be stored in the cargo area 16 of the vehicle 10 or any other location on or within the vehicle 10.

Next, at block 106, the distance advise system 12 is connected to the vehicle 10. In an embodiment, the distance advise system 12 is magnetically connected to the vehicle 10. The distance advise system 12 may be magnetically connected to any metallic component of the vehicle 10 using the magnets 30 that are attached to each housing section 20 of the distance advise system 12.

In an embodiment, the distance advise system 12 is connected to a rear portion of the vehicle 10. In another embodiment, the distance advise system 12 is connected to a front portion of the vehicle 10. In yet another embodiment, one of the housing sections 20 of the distance advise system 12 is connected to the rear portion of the vehicle 10 and another of the housing sections 20 is connected to the front portion of the vehicle 10. This may include detaching one or more of the housing sections 20 from the other housing sections 20 of the distance advise system 12 and then moving that housing section 20 to its desired mounting location on the vehicle 10.

A first of the warning devices 28 is positioned at a desired distance from the vehicle 10 at block 108. This may include pulling the reflective strip 26 that is connected to the warning device 28. The reflective strip 26 may be pulled until it is completely unwound from the reel 24. The reflective strip 26 includes a specific length so that the passenger 15 of the vehicle 10 is not required to make any measurements when setting up the distance advise system 12.

Depending on the set-up scenario, the passenger of the vehicle 10 may optionally position one or more additional warning devices 28 at block 110. The additional warning devices 28 may each be positioned at different distances from the vehicle 10. These distances may also be different from the first positioned warning device 28 of the distance advise system 12. Positioning the additional warning devices 28 includes pulling reflective strips 26 that are connected to the warning devices 28. Each reflective strip 26 includes a specific length so that the passenger of the vehicle 10 is not required to make any measurements when setting up the distance advise system 12.

Figure 9A:
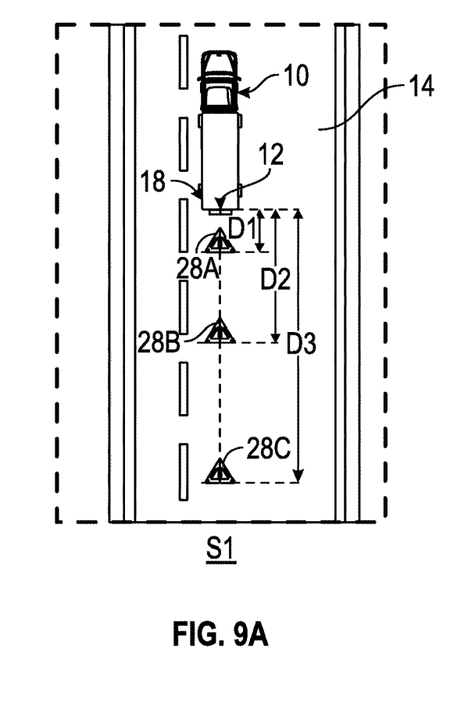
FIGS. 9A, 9B, and 9C schematically illustrate different set-up scenarios of an exemplary vehicle distance advise system.
Figure 9B:
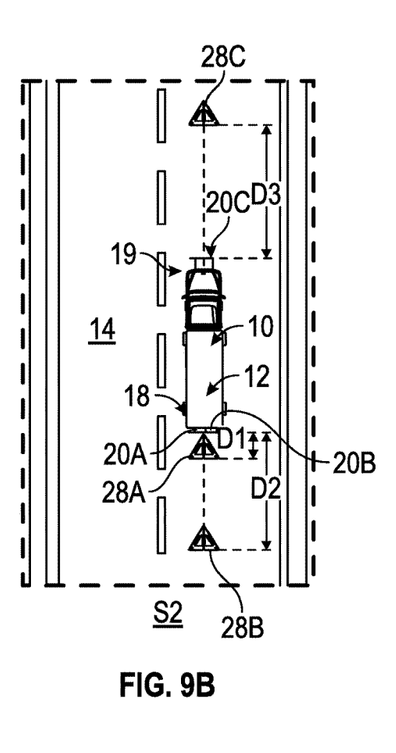
Figure 9C:
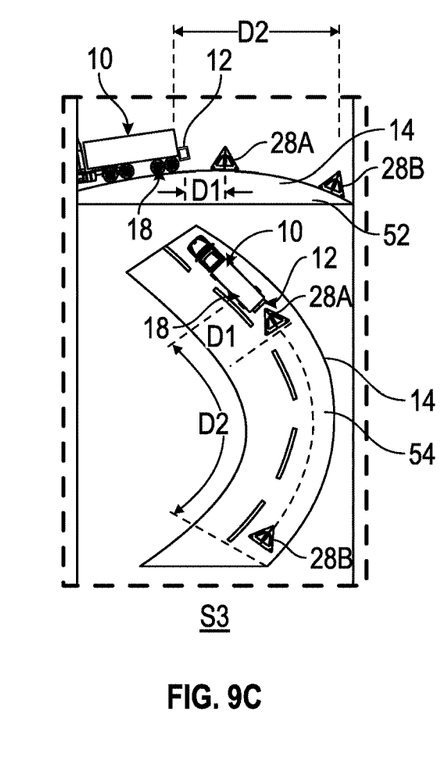

FIGS. 9A, 9B, and 9C schematically illustrate various scenarios for setting up the distance advise system 12 in response to a vehicle immobilizing event. The scenarios illustrated in FIGS. 9A-9C are intended as non-limiting examples for setting up the distance advise system 12.

FIG. 9A illustrates a first scenario S1 for setting up the distance advise system 12 in response to a vehicle immobilizing event which has left the vehicle 10 stranded in the roadway 14. The roadway 14 of this example may be either a one-way roadway or a divided highway. The distance advise system 12 is connected to a rear portion 18 of the vehicle 10. A first warning device 28A of the distance advise system 12 may then be positioned at a first distance D1 from the vehicle 10, a second warning device 28B may be positioned at a second distance D2 from the vehicle 10, and a third warning device 28C may be positioned at a third distance D3 from the vehicle 10. In an embodiment, the first distance D1 is about 10 feet, the second distance D2 is about 100 feet, and the third distance D3 is about 200 feet. However, these distances may vary and are not intended to limit this disclosure.

FIG. 9B illustrates a second scenario S2 for setting up the distance advise system 12 in response to a vehicle immobilizing event which has left the vehicle 10 stranded in the roadway 14. The roadway 14 of this example may be either a two-way roadway or an undivided highway. In such a scenario, a first housing section 20A and a second housing section 20B of the distance advise system 12 are connected to a rear portion 18 of the vehicle 10, and a third housing section 20C of the distance advise system 12 that has been separated from the other housing sections 20A, 20B is connected to a front portion 19 of the vehicle 10. A first warning device 28A of the first housing section 20A may then be positioned at a first distance D1 from the rear portion 18 of the vehicle 10, a second warning device 28B of the second housing section 20B may be positioned at a second distance D2 from the rear portion 18 of the vehicle 10, and a third warning device 28C of the third housing section 20C may be positioned at a third distance D3 from the front portion 19 of the vehicle 10. In an embodiment, the first distance D1 is about 10 feet, the second distance D2 is about 100 feet, and the third distance D3 is about 100 feet. However, these distances may vary and are not intended to limit this disclosure.

FIG. 9C illustrates a third scenario S3 for setting up the distance advise system 12 in response to a vehicle immobilizing event which has left the vehicle 10 stranded in the roadway 14. The roadway 14 of this example may include a hill 52, a curve 54, or some other obstruction. In such a scenario, the distance advise system 12 is connected to a rear portion 18 of the vehicle 10. A first warning device 28A of a first housing section 20A of the distance advise system 12 may then be positioned at a first distance D1 from the rear portion 18 of the vehicle 10, and a third warning device 28C of a third housing section 20B may be positioned at a second distance D2 from the rear portion 18 of the vehicle 10. A second housing section 20B of the distance advise system 12 is not employed in this scenario. In an embodiment, the first distance D1 is about 10 feet and the second distance D2 is between 100 and 500 feet. However, these distances may vary and are not intended to limit this disclosure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle distance advise system, comprising:
   a first housing section including a first reflective strip and a first warning device connected to the first reflective strip; and
   a second housing section removably connected to the first housing section and including a second reflective strip and a second warning device connected to the second reflective strip.

2. The system as recited in claim 1, comprising a third housing section removably connected to the second housing section.

3. The system as recited in claim 1, wherein the second housing section is magnetically connected to the first housing section.

4. The system as recited in claim 1, wherein the first housing section includes a reel rotatably mounted within a housing of the first housing section.

5. The system as recited in claim 4, wherein the first reflective strip is received on the reel.

6. The system as recited in claim 1, wherein the first warning device is connected to the first reflective strip by a connector.

7. The system as recited in claim 6, wherein the connector is a hook that connects to a bracket of the first warning device.

8. The system as recited in claim 1, wherein the second reflective strip includes a different length than the first reflective strip.

9. The system as recited in claim 1, wherein the first warning device includes a reflective surface.

10. The system as recited in claim 1, wherein the first warning device is a warning triangle.

11. The system as recited in claim 1, wherein the first housing section includes a first magnet and the second housing section includes a second magnet.

12. The system as recited in claim 1, wherein the first housing section includes a reel having a shaft disposed between opposing end disks.

13. A vehicle distance advise system, comprising:
    a first housing section including a first reflective strip and a first warning device connected to the first reflective strip; and
    a second housing section removably connected to the first housing section,
    wherein the first warning device is movable between a non-deployed position in which it is received against a housing of the first housing section and a deployed position in which it is spaced a distance apart from the housing.

14. A vehicle distance advise system, comprising:
    a first housing section including a first reflective strip and a first warning device connected to the first reflective strip; and
    a second housing section removably connected to the first housing section,
    wherein the first housing section includes a first magnet and the second housing section includes a second magnet,
    wherein the first magnet is positioned on an exterior surface of a first housing of the first housing section and the second magnet is positioned on an exterior surface of a second housing of the second housing section.

15. A method, comprising:
    connecting a distance advise system to a vehicle;
    positioning a first warning device connected to a first reflective strip of the distance advise system at a first desired distance from the vehicle; and
    positioning a second warning device connected to a second reflective strip of the distance advise system at a second desired distance from the vehicle, wherein the second desired distance is a different distance than the first desired distance.

16. The method as recited in claim 15, wherein connecting the distance advise system includes:
    magnetically connecting a first housing section of the distance advise system to the vehicle; and
    magnetically connecting a second housing section of the distance advise system to the vehicle.

17. The method as recited in claim 16, wherein the first housing section and the second housing section are both connected to a rear portion of the vehicle.

18. The method as recited in claim 16, wherein the first housing section is connected to a rear portion of the vehicle and the second housing section is connected to a front portion of the vehicle.

* * * * *